United States Patent [19]

Aranovsky

[11] Patent Number: 5,122,916
[45] Date of Patent: Jun. 16, 1992

[54] ELECTROMAGNETIC HEAD HAVING INTERFERENCE COMPENSATION CIRCUITRY

[75] Inventor: Anatoly Aranovsky, Tustin, Calif.

[73] Assignee: Archive Corporation, Costa Mesa, Calif.

[21] Appl. No.: 731,285

[22] Filed: Jul. 16, 1991

Related U.S. Application Data

[63] Continuation of Ser. No. 445,805, Dec. 4, 1989, abandoned.

[51] Int. Cl.$^5$ ............................................. G11B 5/17
[52] U.S. Cl. .................................... 360/124; 360/118
[58] Field of Search ............... 360/111, 115, 123, 124, 360/118

[56] References Cited

U.S. PATENT DOCUMENTS 4,460,934  7/1984  Yamada ............................... 360/123
4,984,117  1/1991  Nölke et al. ......................... 360/124

FOREIGN PATENT DOCUMENTS 0261004  12/1985  Japan .................................. 360/123

Primary Examiner—Andrew L. Sniezek
Attorney, Agent, or Firm—Eugene H. Valet

[57] ABSTRACT

In a magnetic sensing head with reduced crossfeed interference circuitry, the winding of each half of a magnetic core of the head is wound in the same direction as the other about the core. Each winding is coupled to an individual differential amplifier and the output of each amplifier is fed to another differential amplifier which provides the head output substantially unaffected by interference signals picked up by the head. Both magnetically coupled and stray capacitive interference are compensated.

4 Claims, 4 Drawing Sheets

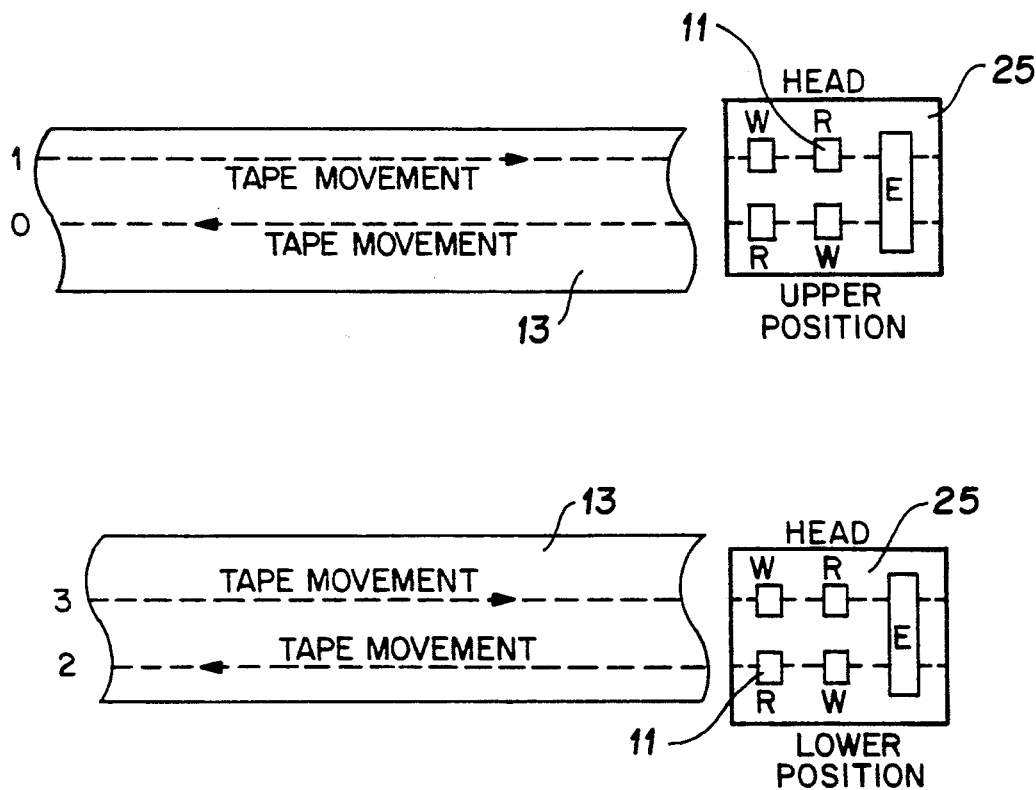
FIG._1A (Prior Art)
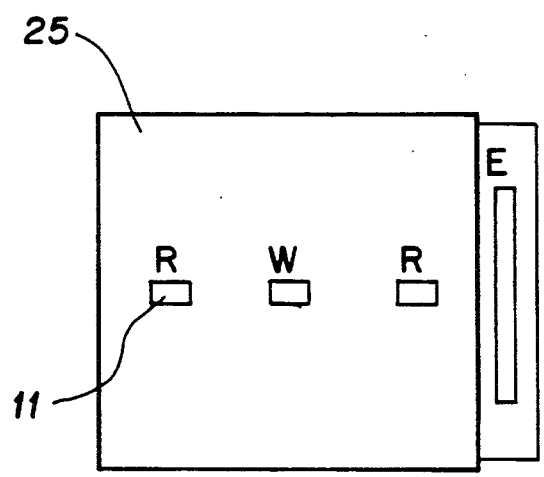
FIG._4 (Prior Art)

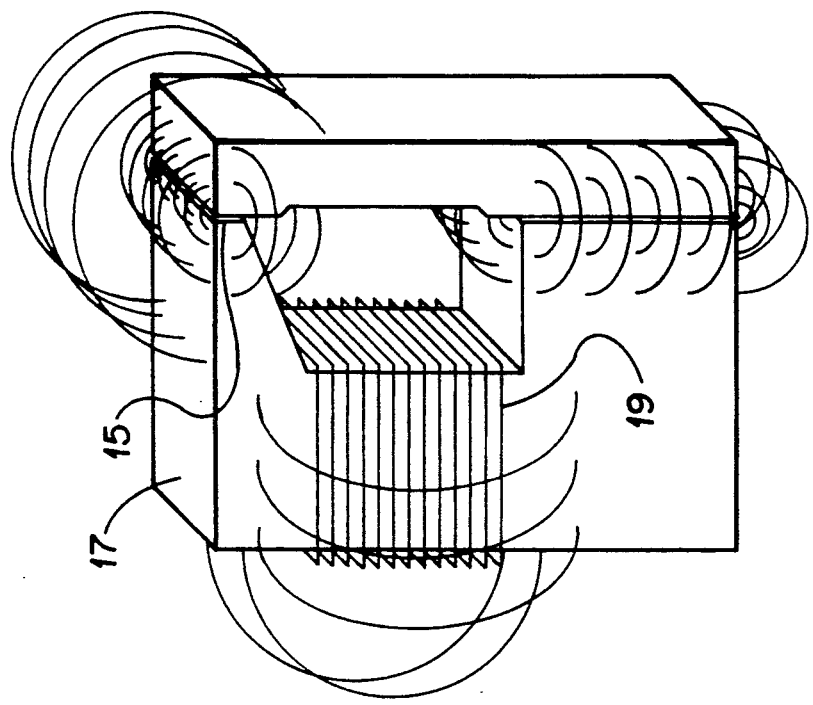
FIG._1B (Prior Art)

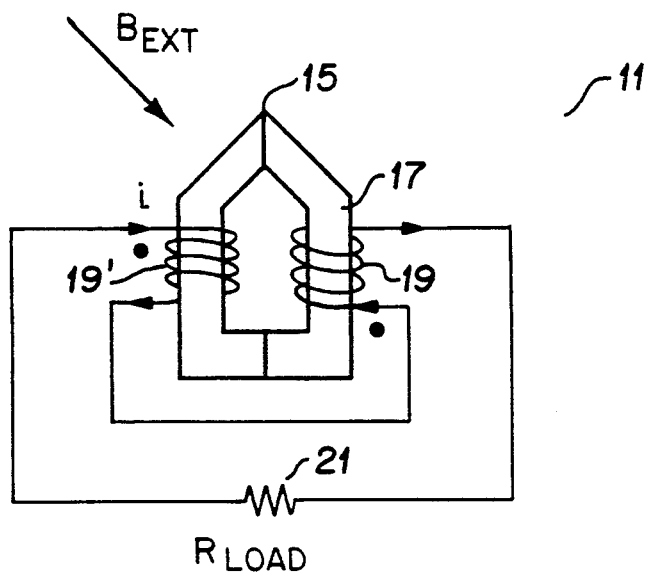
FIG._2 (Prior Art)
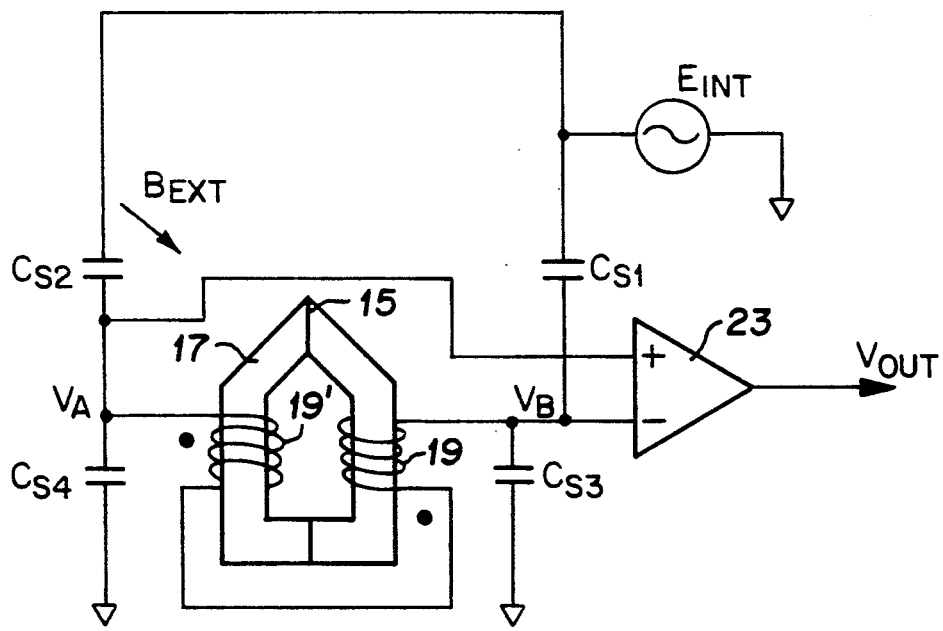
FIG._3 (Prior Art)

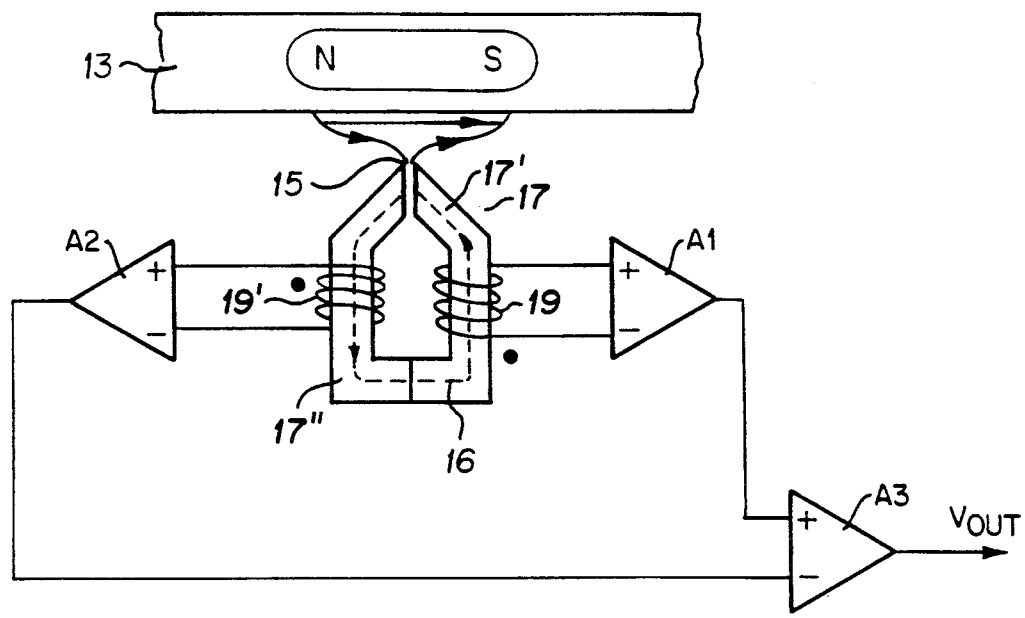
FIG._ 5
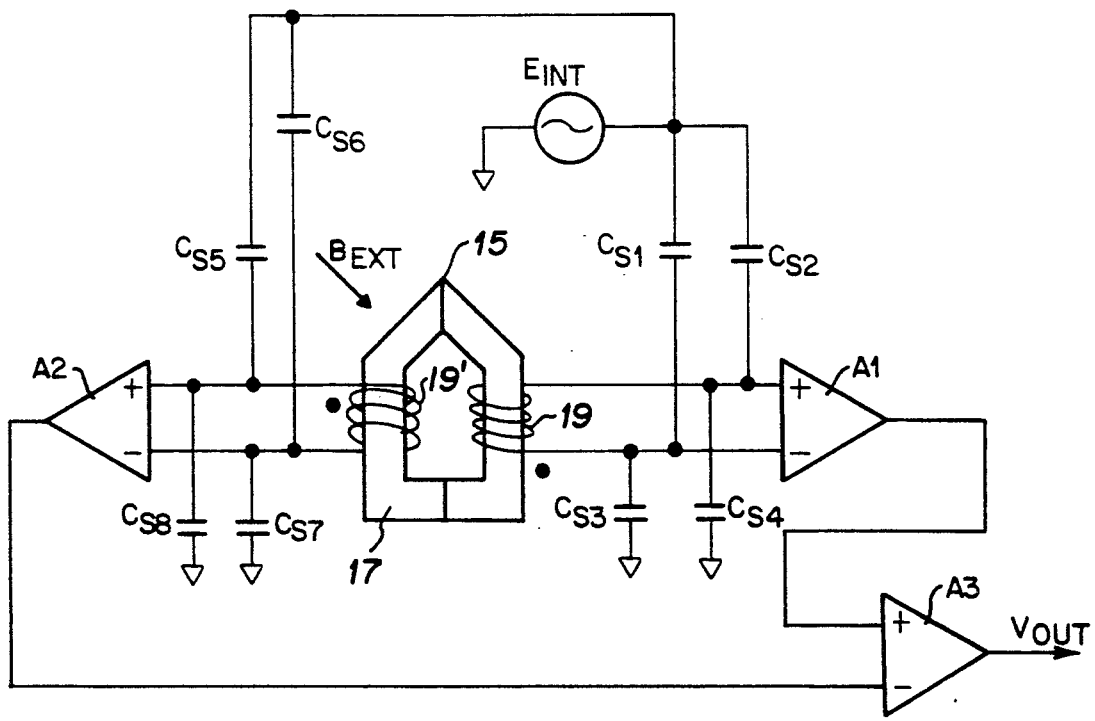
FIG._ 6

ELECTROMAGNETIC HEAD HAVING INTERFERENCE COMPENSATION CIRCUITRY

This application is a continuation of application Ser. No. 07/445,805, filed Dec. 4, 1989 now abandoned.

DESCRIPTION

BACKGROUND OF THE INVENTION

1. Field of the Invention

The present invention relates generally to magnetic storage devices, more particularly to magnetic recording heads and, more specifically, to a device for reducing crossfeed in a magnetic tape, data storage device having a multi-head configuration.

2. Description of the Related Art

From the start, digital computers have required some form of data storage as an adjunct to their relatively sparse main memory facilities.

Magnetic tape devices have been found to be a fast, efficient, economical means for storing computer data, such as for backing-up hard disk software application programs and data created utilizing the programs or for off-line file management tasks routinely implemented between a disk and tape as data is processed.

Streaming magnetic tape drives, also called streamers, are constant speed transports for storing information from computer hard disk drives to provide a portable, backup storage of the computer memory. Such drives generally record bidirectionally, laying down as many parallel tracks as tape head technology will permit in what is commonly called serpentine recording; current technology is about twenty-six tracks on quarter-inch tape. A basic description of computer tape drive technology can be found in *STREAMING*, Copyright 1982, Archive Corporation, Library of Congress Catalog No. 82-072125.

Shown in FIG. 1A is a standard tape head block 25 having multiple heads 11 for serpentine recording of tracks 0 through 3 on recording media 13, in this case, tape segment 13. Such a head block 25 has five "heads" 13 ("R" representing "read;" "W" representing "write;" and "E" representing "erase"). Generally, as shown in FIG. 2, each head 11 comprises individual magnetic cores 17 having air gaps 15 where magnetic flux emanates for writing or erasing and is sensed for reading. Thus, a head block 25 as in FIG. 1A would have five head elements 11. Each core 17 has windings 19, 19' for sensing the electromagnetically induced current when reading magnetic flux changes from a media 13 crossing the gap 15 or for generating the magnetic flux via the gap 15 when writing or erasing on the media 13.

As will be recognized by a person skilled in the art, the dimensions in these FIGURES are greatly exaggerated since an actual head may have a gap of only about two micrometers in a data recording head. Dimensions in head design will vary depending upon the intended function and use, e.g., read, or "playback," write, erase, audio, instrumentation, video, digital audio tape, analog magnetic recording tape, magnetic disks. Gap spacing in the head block also varies depending upon the use of the head, but in a five head block 11 such as depicted in FIGS. 1A and 1B it will generally be about 0.2 inch horizontally by 0.15 inch vertically.

During data verification process by a streaming tape drive, both write and read operations are performed simultaneously, also known as "read-after-write" (RAW) or "read-while-write." Furthermore, in some instances, the erase head is also activated simultaneously. Because of the close relative proximity to each other, a problem arises in that the heads will be loosely coupled through stray electromagnetic flux which emanate from each head as shown in FIG. 1B, represented at an adjacent head throughout the drawings by arrow $B_{EXT}$. This coupling can cause a high level of interfering signal (write, erase or both), particularly in the read channel. This interference can be detrimental to the read operation such as where a head has been adjusted to recognize only those recorded signals having a particular minimum threshold. This phenomenon is commonly known as crossfeed or crosstalk. Unwanted crosstalk signals may also be coupled from adjacent tracks into a core, stray flux from recorded tracks on media or from transformer coupling between core windings.

The common method to combat crossfeed problems is to wind the read head core 17 in the manner as shown in FIG. 2. The read head winding consists of two halves 19, 19' wound in the same directions and coupled in series through a load 21. For the purpose of this disclosure, as used throughout including the claims, "same direction" should be interpreted as to mean identical when taken from a common aspect, such as from the head gap 15 as shown in FIG. 5; e.g., both wound counterclockwise when viewed by an observer in the gap; or, alternatively, when considered as if the core halves were a straight bar. Thus, magnetic flux, /B, in the read head core 17 will produce in both half windings 19. 19' a read signal of the same amplitude and polarity. However, external stray magnetic flux $B_{EXT}$ will induce in each half winding interference signals of opposite polarity that will add algebraically and compensate each other due to the series connection of the two half windings 19, 19'.

A second component of the crossfeed problem is capacitively coupled interference signals. Referring to FIG. 3, such a signal is represented by voltage source $E_{INT}$, coupled through stray capacitances CS1 and CS2. For example, such capacitive coupling interference may be caused by signals at an adjacent head or adjacent cabling. Stray capacitance between winding leads and ground are represented by equivalent stray capacitances CS3 and CS4. Because, in general, the windings and winding leads will not be exactly the same distance from the interference source $E_{INT}$, stray capacitances CS1 and CS2 will not be of equal value.

As illustrated in FIG. 3, a known method for reducing such capacitively coupled interfering signals is to use a differential amplifier 23 with a sufficient common mode rejection ratio. However, the degree of mutual compensation of the interference signals is strongly dependent on signal balance. Thus, if two interference signal levels in each winding are not approximately equal, the known methods for compensation become inadequate.

Thus, to have sufficient suppression of the crossfeed, it is essential to:

balance interference signals in both half windings 19, 19' of the read head in the case of magnetic coupling, and balance interfering signals at the inverting (−) input and non-inverting (+) inputs of the head output differential amplifier 23 in the case of electrical coupling.

The problem is exacerbated in a streaming tape drive head as specified by the Quarter Inch Committee (QIC)

standard promulgated for 1.3 Gigabyte, 30 track, recording, as depicted schematically in FIG. 4. Here the read head gap length is approximately 17 microinches with a center write head gap of approximately 75 microinches and an erase gap of 500 microinches in a new configuration which presents the need for a more sophisticated solution to the crossfeed problem.

SUMMARY OF THE INVENTION

It is an advantage of the present invention that it improves the rejection of magnetically coupled interference between magnetic heads in a multi-head configuration.

It is an advantage of the present invention that it improves the rejection of electrically (capacitively) coupled interference between magnetic heads in a multi-head configuration.

It is a further advantage of the present invention that one solution is provided to solve problems caused by both magnetic coupling and capacitive coupling interference.

It is yet another advantage of the present invention that it can be applied advantageously to any form of magnetic head regardless of the medium upon which the information is magnetically stored.

In its basic aspects, the present invention is a device for compensating interference signals in an electromagnetic sensing head having a core of two opposing halves separated by an air gap and two windings wrapped in the same direction about each said core half. A first circuit device is coupled to the ends of one of said windings for sensing the induced signal in said winding. A second circuit device is coupled to the ends of the second of said winding for sensing the induced signal in said second winding. A third circuit device is coupled to the output of said first and second for providing an output from said head indicative of the electromagnetic flux sensed in said air gap because the first and second are coupled to said windings and balanced such that electrical and magnetic interference signals sensed are substantially eliminated from affecting said indication of the electromagnetic flux sensed in said air gap.

Other objects, features and advantages of the present invention will become apparent upon consideration of the following detailed description and the accompanying drawings, in which like reference designations represent like features throughout the FIGURES.

BRIEF DESCRIPTION OF THE DRAWINGS

FIG. 1A (PRIOR ART) is a schematic depiction of a conventional magnetic recording head (top plan view) for serpentine recording. FIG. 1B (PRIOR ART) is a schematic representation of magnetic flux about a write head coil when writing.

FIG. 2 (PRIOR ART) is a schematic detail diagram of a conventional magnetic recording read head.

FIG. 3 (PRIOR ART) is a schematic diagram of a conventional magnetic recording read head as shown in FIG. 2 showing the electrical equivalents of capacitively coupled interference signals.

FIG. 4 (PRIOR ART) is a schematic depiction (top plan view) of a head block for a QIC 1350 Standard magnetic head.

FIG. 5 is a schematic diagram of the preferred embodiment of the present invention.

FIG. 6 is a schematic circuit diagram depicting electrical equivalents of stray capacitive coupling interference signals to be balanced in accordance with the invention as shown in FIG. 5.

The drawings referred to in this description should be understood as not being drawn to scale except if specifically noted.

DETAILED DESCRIPTION OF THE INVENTION

Reference is made now in detail to a specific embodiment of the present invention, which illustrates the best mode presently contemplated by the inventor(s) for practicing the invention. While one specific example is disclosed in terms of a magnetic tape read head of a computer tape drive apparatus, it would be obvious to a person skilled in the art that alternative embodiments are readily adaptable to many other magnetic recording applications.

As mentioned, a read head winding consists of two halves with sensing coils wound in the same rotational direction. Magnetic flux in the read head core will produce a read signal of the same amplitude and polarity in both half winding. If connected in series as is common in the prior art as shown in FIG. 1, external (meaning not from the intentionally picked-up magnetic flux in the read gap), stray magnetic flux $B_{EXT}$, such as from an adjacent write head during a RAW data verification operation, will induce in each half winding interference signals of opposite polarity that will add algebraically due to the series connection. The degree of mutual compensation of the interference signals in the two halves of the read head winding 19, 19' is strongly dependent on signal balance—on whether the two interference signals are substantially identical.

Referring to FIG. 3, a concurrent crossfeed problem of capacitively coupled interference from a source $E_{INT}$ is demonstrated through an electrical equivalents schematic drawing. To balance interference signals at the non-inverting (+) and inverting (−) inputs of amplifier 23, it would be required that coupling stray capacitance $C_{S1}$ be equal to coupling stray capacitance $C_{S2}$. This implies, however, that the source of the interference is physically located symmetrically with respect to each half winding—which is not usually the case. In addition, inductance and stray capacitance of both half windings should be identical. In other words, capacitively coupled interference rejection can be achieved by using a differential amplifier 23 with sufficient common mode rejection ratio, but even an "ideal" amplifier can maintain such a ratio only when its inputs, + and −, are balanced with respect to the signal source $E_{INT}$.

Referring now to FIG. 5, the preferred embodiment of the present invention is demonstrated. The read head 17, having two opposing core halves 17', 17" separated at a gap 15, has two wound sensing coils 19, 19' having the same winding direction when considering the core as a whole. The windings 19, 19' are coupled to separate differential amplifiers A1, A2.

The winding 19 of core half 17' is coupled to a differential amplifier A1 with the winding 19 positive end terminus coupled to the differential amplifier A1 inverting input terminal and the winding 19 negative end terminus coupled to the differential amplifier A1 noninverting input terminal.

Conversely, the winding 19' of core half 17" is coupled to a second differential amplifier A2 with the winding 19' positive end terminal coupled to the differential amplifier A2 noninverting input terminal and the winding 19' negative end terminus coupled to the differential amplifier A2 inverting input terminal.

The outputs of the differential amplifiers A1, A2 feed the summing differential amplifier A3 at its noninverting and inverting input terminals, respectively.

The gain factors of the first and second amplifiers A1, A2 are selected, or adjusted, to provide inputs to A3 which are of equal amplitude. Thus, amplitude equalization of the magnetically coupled and capacitively coupled interference signals that is necessary for crossfeed rejection is achieved.

The electrical equivalent circuit for stray capacitance coupling in the device of FIG. 5 is shown in FIG. 6. The matching between stray capacitances, CS1 and CS2, CS3 and CS4, CS5 and CS6,, CS7 and CS8, is recognized because of the small geometry of the windings relative to the distance to the source of the interference and the size of the head core.

In other words, with the present invention, the balance must be maintained only with respect to the leads of the separate half windings 19, 19'. This is accomplished via the present invention as shown in FIG. 5. Thus, as represented by arrow 16, a magnetic flux line representative of flux, or flux change representing data bits, is sensed by the coils 19, 19' and represented accurately at Vout with interference compensated.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its best mode practical application to thereby enable others skilled in the art to understand the invention for various embodiments and with various modifications and applications as are suited to the particular use contemplated. It is intended that the scope of the invention be defined by the claims appended hereto and their equivalents.

What is claimed is:

1. An electromagnetic read head with circuitry for compensating stray magnetic flux inducted interference signals and stray capacitance interference signals in said head, said head having a core having two opposing halves separated by a read head gap which senses flux changes recorded in a magnetic media brought proximate to said gap, comprising:
   a first coil winding and a second coil winding, one per each core half, individually wrapped in the same direction about said core;
   a first adjustable gain differential amplifier, having two inputs coupled to the first coil winding in a first polarity configuration and a first output terminal for providing an output signal based upon induced total current in said first winding;
   a second adjustable gain differential amplifier, having two inputs coupled to the second coil winding in a second polarity configuration being opposite said first polarity configuration and a second output terminal for providing an output signal based upon induced total current in said second winding; and
   a third differential amplifier, having a first input terminal coupled to said first output terminal and a second input terminal coupled to said second output terminal, for providing an output signal at a third output terminal, such that said output signal at said third output terminal is substantially compensated for said interference signals in said first coil winding and said second coil winding, whereby the output signal at said third output terminal is indicative only of the flux changes recorded in said magnetic media.

2. The electromagnetic read head as set forth in claim 1, wherein said first differential amplifier and said second differential amplifier each has a gain factor which provides at their respective outputs substantially equal amplitude interference signals to said first and second input terminals respectively of said third differential amplifier,
   whereby a net input to said first input terminal and said second input terminal of said third differential amplifier is indicative only of the flux changes recorded in said magnetic media and sensed in said first coil winding and said second coil winding respectively.

3. A magnetic head, for sensing flux from magnetic media which is brought into close proximity to said head, coupled to crossfeed reduction circuitry, comprising:
   a magnetic core having two opposingly oriented halves;
   an air gap separating said two opposingly oriented halves for sensing magnetic field flux variations induced by said medial across said air gap;
   a first coil winding about one core half and having positive and negative terminals;
   a second coil winding about the other core half ahd having positive and negative terminals, wherein said first and second coil windings are effectively wound in the same direction about said core;
   a first adjustable gain differential amplifier having inverting and noninverting input terminals coupled to the first coil winding with said first coil winding positive terminal coupled to said noninverting input and said first coil winding negative terminal coupled to said inverting input, and having a first output port;
   a second adjustable gain differential amplifier having inverting and noninverting input terminals coupled to the second coil winding with said second coil winding positive terminal coupled to said inverting input terminal of said second adjustable gain differential amplifier and said second coil winding negative terminal coupled to said noninverting input terminal of said second adjustable gain differential amplifier and having a second output port;
   a third differential amplifier having two inputs coupled to said first output port and said second output port, respectively, and having a third output port, wherein said first and second differential amplifiers have gains adjusted to substantially eliminate interference signals coupled to said first coil winding and said second coil winding from affecting the sensing of magnetic flux from said media in said air gap and output from said third differential amplifier.

4. An improved magnetic head device having a magnetic core having: two halves, an air gap separating said two halves for sensing magnetic field flux variations from magnetic tape transported by a drive across said air gap, a first coil winding about one core half having positive and negative terminals, and a second coil winding about the other core half having positive and negative terminals, each said coil winding being wound about said core in the same direction, said coil windings coupled to interference reduction circuitry characterized by:

a first adjustable gain differential amplifier having an inverting input and a noninverting input coupled to the first coil winding with said inverting input coupled to the first coil winding positive terminal and said noninverting input coupled to the first coil winding negative terminal, and a first amplifier output terminal;

a second adjustable gain differential amplifier having an inverting input and a noninverting input coupled to the second coil winding with said inverting input coupled to the second coil winding negative terminal and said noninverting input coupled to the second coil winding positive terminal and a second amplifier output terminal; and a third differential amplifier having a first input coupled to the first amplifier output terminal and a second input coupled to the second amplifier output terminal and a third amplifier output for transmitting a signal substantially representative of only the flux sensed in said gap from said magnetic tape.

* * * * *